(12) United States Patent
Roesch et al.

(10) Patent No.: US 7,958,556 B2
(45) Date of Patent: Jun. 7, 2011

(54) INTRUSION AND MISUSE DETERRENCE SYSTEM EMPLOYING A VIRTUAL NETWORK

(75) Inventors: Martin F. Roesch, Eldersburg, MD (US); Ronald J. Gula, Columbia, MD (US)

(73) Assignees: Verizon Corporate Services Group Inc., Basking Ridge, NJ (US); Level 3 Communications, LLC, Broomfield, CO (US); Raytheon BBN Technologies Corp., Cambridge, MA (US)

( * ) Notice: Subject to any disclaimer, the term of this patent is extended or adjusted under 35 U.S.C. 154(b) by 1111 days.

(21) Appl. No.: 10/978,765

(22) Filed: Nov. 1, 2004

(65) Prior Publication Data
US 2005/0177871 A1    Aug. 11, 2005

Related U.S. Application Data

(63) Continuation of application No. 09/548,547, filed on Apr. 13, 2000, now Pat. No. 7,240,368.

(60) Provisional application No. 60/129,266, filed on Apr. 14, 1999.

(51) Int. Cl.
*G06F 12/14* (2006.01)
*G06F 12/16* (2006.01)
*G08B 23/00* (2006.01)

(52) U.S. Cl. ............... 726/23; 726/13; 726/14; 726/15; 726/25

(58) Field of Classification Search ................... None
See application file for complete search history.

(56) References Cited

U.S. PATENT DOCUMENTS
5,432,932 A    7/1995   Chen et al.
(Continued)

FOREIGN PATENT DOCUMENTS
WO    WO/97/040610    10/1997

OTHER PUBLICATIONS

Amoroso E et al: "A selection criteria for intrusion detection systems" Computer Security Applications Conference, 1998, Proceedings. 14TH Annual Phoenix, AZ, USA Dec. 7-11, 1998, Los Alamitos, CA, USA,IEEE Comput. Soc, US, Dec. 7, 1998, pp. 280-288.

(Continued)

*Primary Examiner* — Benjamin E Lanier (57) ABSTRACT

A method and apparatus is disclosed for increasing the security of computer networks through the use of an Intrusion and Misuse Deterrence System (IMDS) operating on the network. The IMDS is a system that creates a synthetic network complete with synthetic hosts and routers. It is comprised of a network server with associated application software that appears to be a legitimate portion of a real network to a network intruder. The IMDS consequently invites inquiry and entices the intruder away from the real network. Simulated services are configured to appear to be running on virtual clients with globally unique, class "C" IP addresses. Since there are no legitimate users of the virtual network simulated by the IMDS, all such activity must be inappropriate and can be treated as such. Consequently, the entire set of transactions by an intruder can be collected and identified rather than just those transactions that meet a predefined attack profile. Also, new exploits and attacks are handled just as effectively as known attacks, resulting in better identification of attack methodologies as well as the identification and analysis of new attack types. Since the IMDS only has to be concerned with the traffic going to its simulated hosts it additionally eliminates the bandwidth limitation that plagues a traditional intrusion detection system (IDS).

16 Claims, 8 Drawing Sheets

U.S. PATENT DOCUMENTS

| | | | |
|---|---|---|---|
| 5,557,742 | A | 9/1996 | Smaha et al. |
| 5,606,668 | A | 2/1997 | Shwed |
| 5,623,601 | A | 4/1997 | Vu |
| 5,793,763 | A | 8/1998 | Mayes et al. |
| 5,828,846 | A | 10/1998 | Kirby et al. |
| 5,884,025 | A | 3/1999 | Baehr et al. |
| 5,991,881 | A | 11/1999 | Conklin et al. |
| 6,331,984 | B1 | 12/2001 | Luciani |
| 6,408,391 | B1 * | 6/2002 | Huff et al. .................. 726/22 |
| 6,625,145 | B1 * | 9/2003 | Winell .................. 370/389 |
| 7,412,722 | B1 | 8/2008 | Norris |

OTHER PUBLICATIONS

Mukherjee B et al: "Network Intrusion Detection Intrusion Detection is a New, Retrofit Approach for Providing a Sense of Security in Existing Computers and Data Networks, While Allowing Them to Operate in Their Current Open Mode" IEEE Network, IEEE Inc. New York, US, May 1994, pp. 26-41.

Lunt T F: "A Survey of Intrusion Detection Techniques" Computers &Security. International Journal Devoted to the Study of Technical and Financial Aspects of Computer Security, Elsevier Science Publishers. Amsterdam, NL, vol. 12, No. 4, Jun. 1, 1993, pp. 405-418.

NetFacade Data Sheet, Marketing Brochure, Nov. 9, 2000.

Verizon Federal Network Systems Unit Upgrades Web Security Software, Media Contact: Mark Marchand, http:// newscenter.verizon.com/proactive/newsroom/release.vtml?id=56669, Jun. 19, 2001 (3 pages).

* cited by examiner

INTRUSION AND MISUSE DETERRENCE SYSTEM EMPLOYING A VIRTUAL NETWORK

RELATED APPLICATIONS

This is a continuation of prior application Ser. No. 09/548,547, filed Apr. 13, 2000 now U.S. Pat. No. 7,240,368, entitled "INTRUSION AND MISUSE DETERRENCE SYSTEM." which claims the benefit of U.S. Provisional Application No. 60/129,266, filed Apr. 14, 1999, entitled "Intrusion and Misuse Deterrence System".

STATEMENT REGARDING FEDERALLY SPONSORED RESEARCH OR DEVELOPMENT

This invention was made with Government support under Contract No. DCA100-96-D-0048 awarded by DISA. The Government has certain rights in this invention.

FIELD OF THE INVENTION

This invention relates generally to computer networks, and more particularly, to a system for identifying intruders on a computer network.

DESCRIPTION OF RELATED ART

The popularity of the Internet has led to the emergence of the largest and most diverse collection of information the world has ever known. People are conducting transactions over the Internet today that historically required intensive face-to-face interaction. Together with this popularity has come a concomitant rapid growth in the transmission of confidential information over these networks. As a consequence, there is a critical need for improved approaches to ensuring the confidentiality of private information that travels over computer networks.

Traditional intrusion detection systems (IDS) protect networks against intruders by examining the content of each packet or message passing into the network and making a determination as to whether or not it is suspicious, based on pattern matching and a set of general rules. As networks get larger, this approach of looking at every packet presents several drawbacks. One limitation is the speed at which the IDS can process the information contained in the millions of packets that cross network boundaries every hour of every day. As the networks get faster, the IDS has even less time to make determinations on the packets it examines before it starts to miss packets or degrade system performance.

Figure 1:
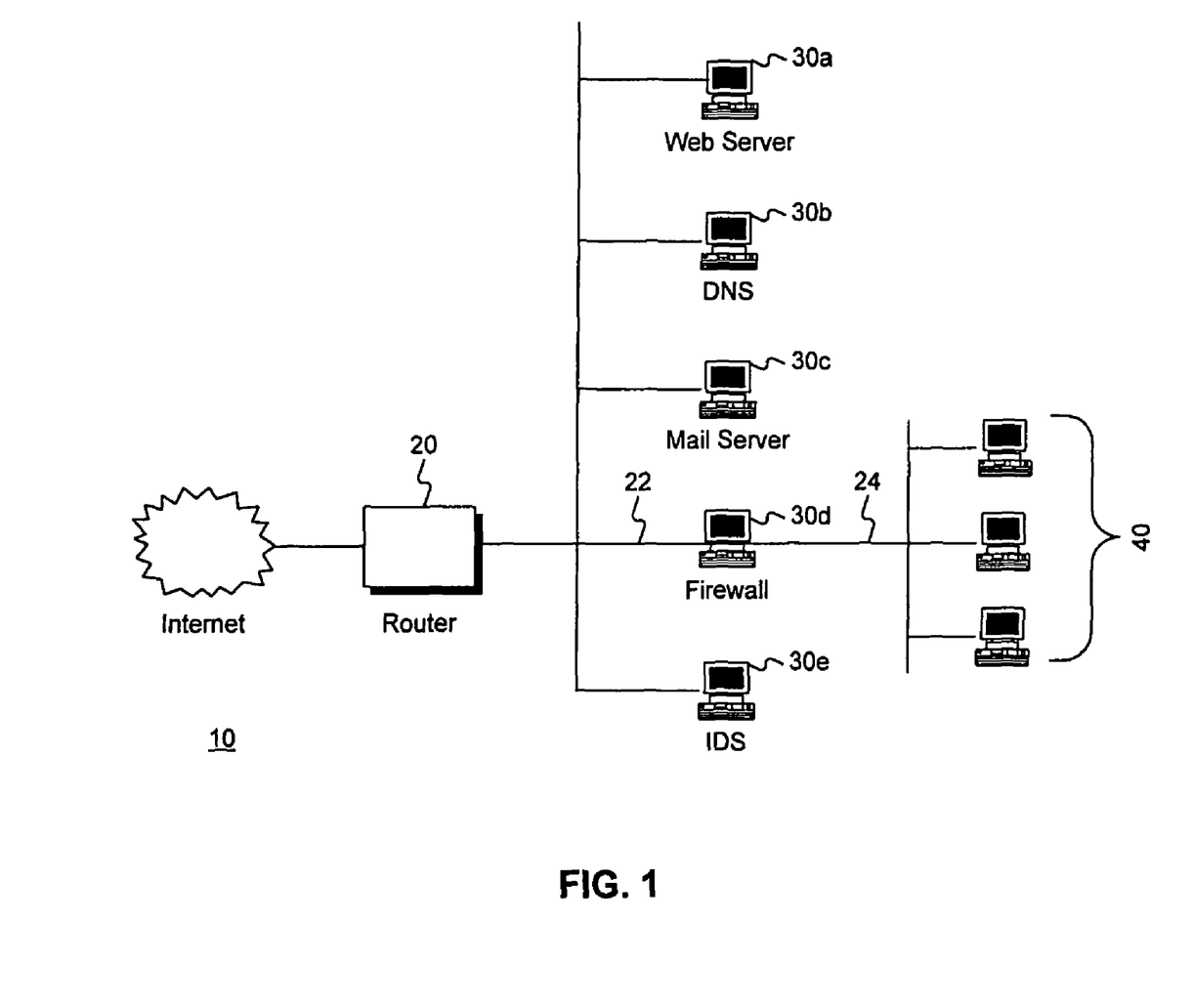
FIG. 1 is a network diagram of a conventional client/server network.

As an example, consider the Internet-based (client/server) network 10 shown in FIG. 1. Network 10 includes a router 20, multiple clients 30 (e.g., clients 30*a-e*), each of which comprises a personal computer or workstation. In a typical Internet network, each client 30 may be configured to perform specific functions. For example, client 30*a* may be configured as a web server, client 30*b* may be a domain name server (DNS), client 30*c* may be a mail server, client 30*d* may be a firewall, and client 30*e* may be a conventional IDS.

By way of background, a web server (client 30*a*) is a computer on the Internet with software operating on it to handle hypertext communications. Human operators route access requests to network devices through the use of unique alphanumeric host names that correspond to each server. The actual routing of information is performed through the use of Internet Protocol (IP) addresses. An IP address is a 32 bit (four octet format), non-symbolic number, which represents the unique address of a device connected to the Internet. The IP addresses with their associated alphanumeric host names and network locations are stored in web server 30*a*.

Globally unique IP addresses are issued to enterprises by a central authority known as the Internet Assigned Number Authority ("IANA"). The IANA issues such addresses in one of three commonly used classes. Class "A" IP addresses employ their first octet as a "netid" and their remaining three octets as a "hostid." The netid identifies the enterprise network and the hostid identifies a particular host on that network. As three octets are available for specifying a host, an enterprise having class "A" addresses has nearly 17 million addresses at its disposal for use with possible hosts. Class "B" addresses employ their first two octets to identify a network (netid) and their second two octets to identify a host (hostid). Thus, an enterprise having class "B" addresses can use those addresses on approximately 64,000 hosts. Finally, class "C" addresses employ their first three octets as a netid and their last octet as a hostid. Only 254 host addresses are available to enterprises having class "C" addresses.

When packets are routed through router 20 to network 10, they are transmitted to web server 30*a*, which determines whether the destination is located in network 10. Next, they are transmitted to IDS 30*e* that then evaluates the contents, source and destination of each packet to ascertain whether the packet is an intruder. Once IDS 30*e* determines the packet is valid, it may then be routed to firewall 30*d* that again evaluates the source, contents and destination of the packet to ascertain whether the packet may be properly routed to intranet 40. As networks continue to grow and as the number of packets transiting typical networks continues to skyrocket, so does the processing overhead that must be dedicated to IDS 30*e*.

Another problem with current intrusion detection systems is their ability to distinguish appropriate use from inappropriate use. The packets collected by IDS 30*e* are examined based on fixed patterns in the pattern matching library and a set of general rules. As new attacks come out, these rules and patterns become outdated and the IDS misses the new attacks completely. There is also a limit to the number of rules that can be loaded into the system at a given time due to packet inspection time restrictions imposed by the amount of bandwidth on the networks.

The net effect is that output of traditional IDS systems is unreliable, voluminous and consequently often ignored by security personnel. While it is clear that numerous methods thus far have been proposed for protecting networks from unauthorized access, as a general rule those methods tend to be unsophisticated, inefficient and incapable of effectively securing a network against the efforts of the modern-day hacker. Furthermore, the processing burden of current IDS systems makes them impractical for use with the larger, faster networks, where they are arguably needed the most.

There is a need therefore for an improved apparatus and method that overcomes the shortcomings of conventional IDSs.

SUMMARY OF THE INVENTION

Systems and methods consistent with this invention increase the security of computer networks through the use of an Intrusion and Misuse Deterrence System (IMDS) that passively detects network intruders in a manner that adds little overhead to a computer network, is adaptive, and easily implemented on any size network. The IMDS creates a synthetic network complete with synthetic hosts and routers. In operation, the IMDS monitors packet flow in an enterprise until it determines that a packet is destined for the synthetic network. Since there are no legitimate users on the synthetic or virtual network, the IMDS identifies the source of the packet and notifies a system administrator of the presence of a network intruder. The IMDS also identifies network intruders by monitoring change logs associated with the virtual network, and notifying a system administrator when it notices an adjustment in the size of the change log. In addition to notifying a system administrator, the IMDS also notifies other network access control devices (e.g., routers, firewalls, etc.) when it detects the presence of an intruder.

Additional objectives, features and advantages of the invention are set forth in the following description, apparent from the description, or may be learned by practicing the invention. Both the foregoing general description and the following detailed description are exemplary and explanatory and are intended to provide further explanation of the invention as claimed.

DESCRIPTION OF THE DRAWINGS

The accompanying drawings, that are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

A system in accordance with the present invention comprises a network server with associated application software that appears to be a legitimate portion of a real network to a network intruder. The IMDS consequently invites inquiry and entices the intruder away from the real network. Simulated services are configured to appear to be running on virtual clients with globally unique, class "C" IP addresses. Valid network users are aware of the virtual network and its purpose. Consequently, there are no legitimate users of the virtual network, and all such activity must be inappropriate and can be treated as such. The ability of the IMDS to detect inappropriate activity based solely on the destination of network traffic results in two major benefits. One is that the entire set of transactions by an intruder can be collected and identified rather than just those transactions that meet a predefined attack profile. Second, because the system operates independently of attack type, new exploits and attacks are handled just as effectively as known attacks, resulting in better identification of attack methodologies as well as the identification and analysis of new attack types. The IMDS also eliminates the bandwidth limitation that plagues traditional IDSs. Instead of having to watch all of the traffic on a network segment, the IMDS only has to be concerned with the traffic going to its simulated hosts. This relieves the problem of monitoring networks with ever increasing bandwidth. The IMDS also has the side effect of distracting attackers away from the real hosts that it is protecting.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, workstations, or personal computers are connected via communication links of various types. In a client server arrangement, programs and data, many in the form of objects, are made available by various members of the system.

Figure 2:
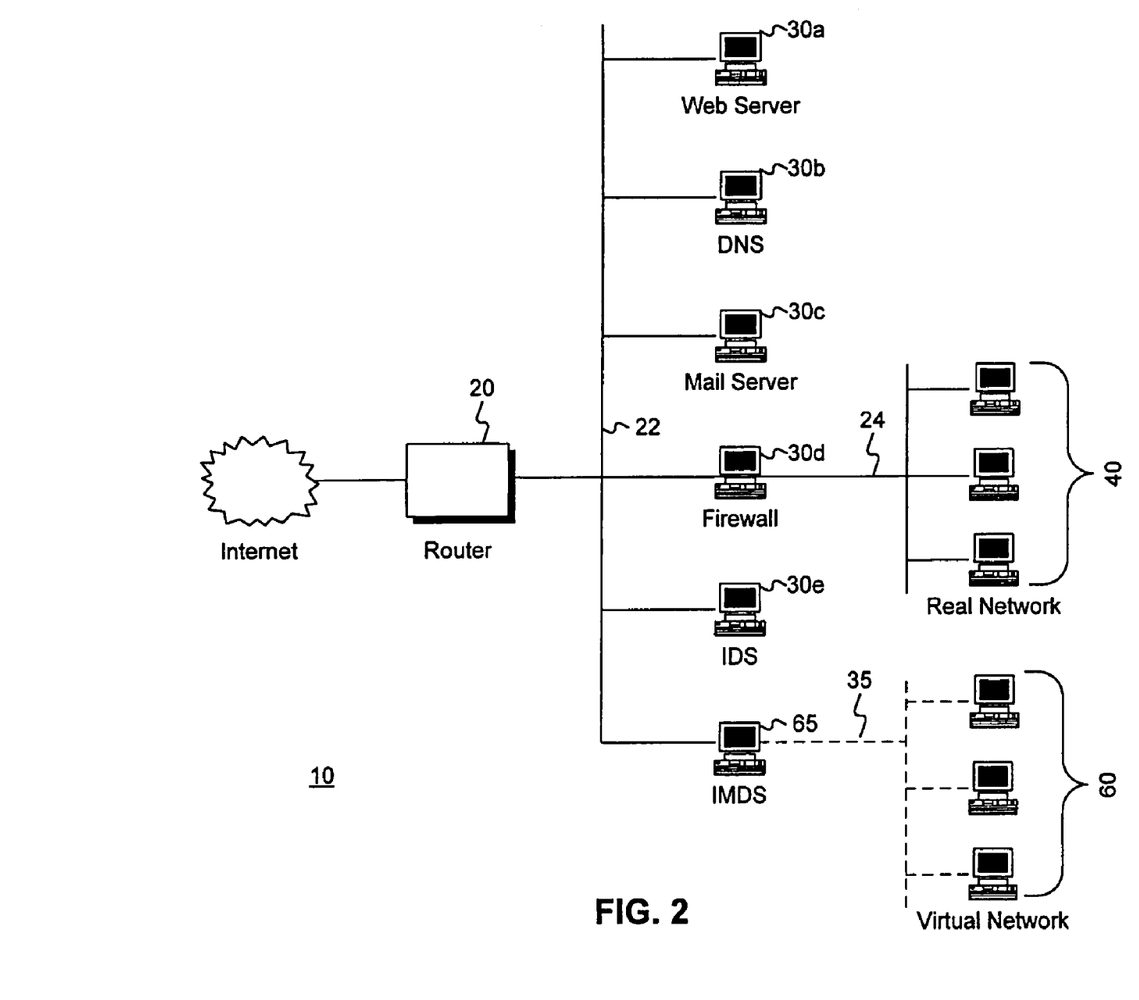
FIG. 2 is a network diagram of a client server network consistent with the present invention.

A system in accordance with the present invention is shown in FIG. 2. Like the conventional network shown in FIG. 1, network 10 in FIG. 2 is comprised of a plurality of network computers 30. In addition to the network computers shown in FIG. 1, network 10 in FIG. 2 is comprised of an Intrusion and Misuse Deterrence System (IMDS) 65. The dotted lines 35 extending from IMDS 65 depict the structure of a class "C" virtual network 60 operating on IMDS 65. In other words, virtual network 60 is not a collection of physical computers, but instead is a program operating on IMDS 65 that simulates a collection of approximately 254 physical computers to network users.

Figure 3:
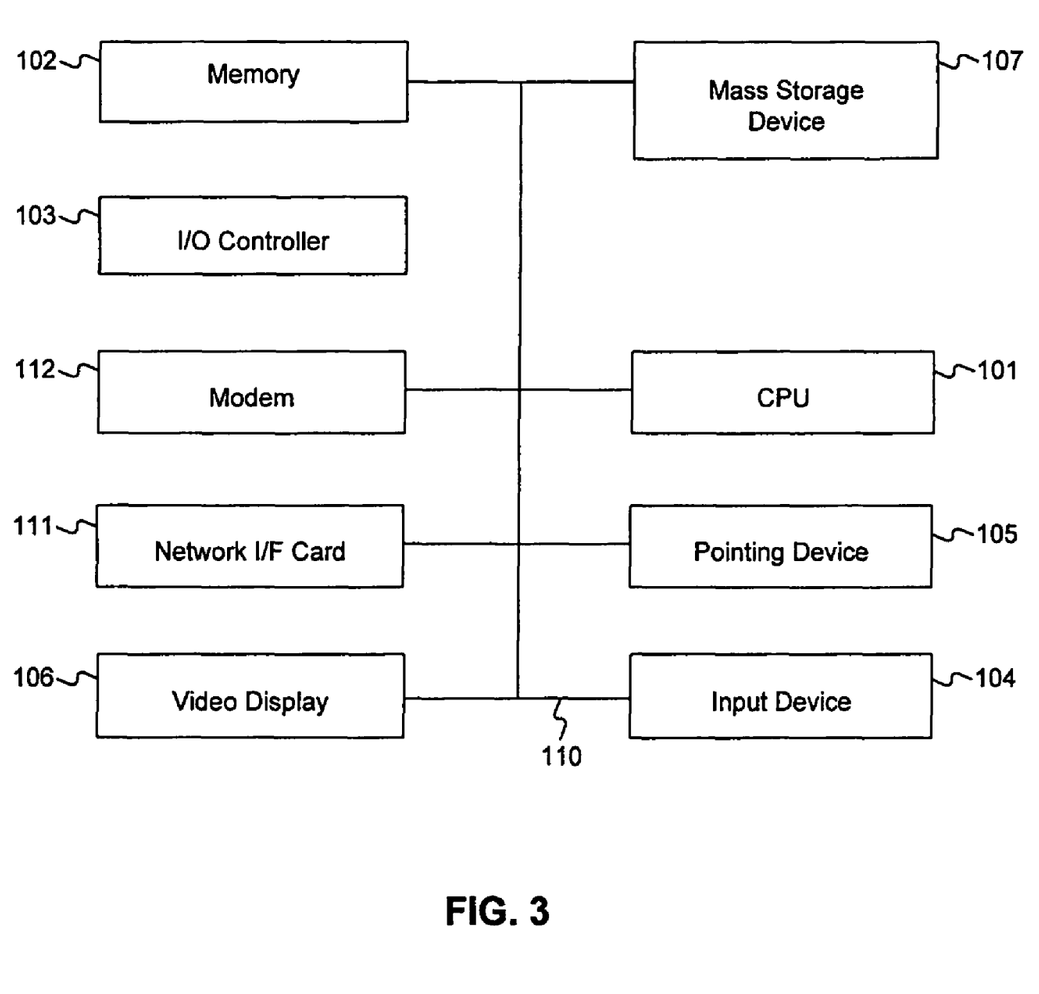
FIG. 3 is a detailed block diagram of a computer system as shown in FIGS. 1 and 2.

A more detailed block diagram of each network computer (clients 30a-e, and IMDS 65) operating on network 10 is shown in FIG. 3. Each network computer comprises a central processor 101, a main memory 102, an input/output controller 103, an input device (e.g., keyboard) 104, a pointing device 105 (e.g., mouse, track ball, pen device, or the like), a display or screen device 106, a mass storage 107 (e.g., hard or fixed disk, removable floppy disk, optical disk, magneto-optical disk, or flash memory), a network interface card or controller 111 (e.g., Ethernet), and a modem 112 (e.g., 56K baud modem or ISDN modem). As shown, the various components of each network computer communicate through a system bus 110 or similar architecture. Each computer communicates with other systems via a network interface card 111 and/or modem 112.

Figure 4:
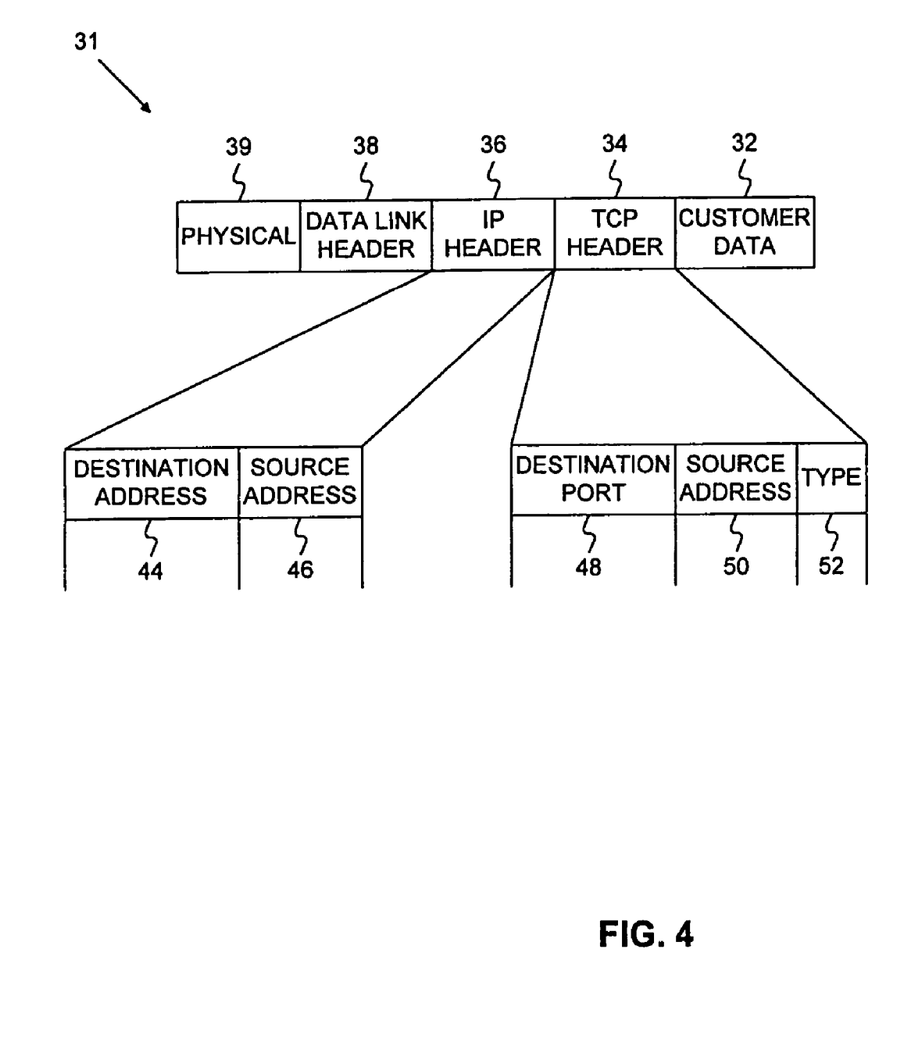
FIG. 4 is a block diagram of a data packet consistent with the present invention.

FIG. 4 shows the structure of a typical data packet 31 that transits network 10. User datagram protocol/Internet protocol (UDP/IP) and transmission control protocol/Internet protocol (TCP/IP) packet transport mechanisms provide efficient data transportation, whereby the transmission of digital network data is transparent or invisible to the user. While this specification describes the system in terms of the TCP/IP protocol, it is important to realize that present invention can function with either protocol. Each packet 31 has customer data bytes 32 encapsulated successively in a TCP envelope that begins with a TCP header 34, an IP envelope that begins with an IP header 36, a data link envelope that begins with a data link header 38, and a physical envelope 39. The IP header 36 contains IP destination address 44 and IP source address 46. The TCP header 34 contains TCP destination port 48, TCP source address 50 and packet-type 52.

Under the TCP/IP protocol, and other connection oriented protocols, a device outside of network 10 intending to communicate with a client (20, 30a-e, and 65) on network 10, begins communication by sending a packet 31 which has the identifier of a client on network 10 in its TCP destination port field 48. The packet 31 passes via router 20 to its desired destination. If a device on network 10 is willing to communicate with the foreign device, it responds with a SYN (synchronize) packet to establish a connection. Subsequent packets may then be sent back and forth freely through the router 20. The router 20 may include a comparator executing in CPU 101 which determines whether a packet's data link header type 52 is in a protocol table containing a pre-stored list of protocols (e.g., TCP/IP) valid for use on network 10. A second comparator may determine whether the packet's IP destination address 44 and, in some cases, the TCP destination port 48 are in a destination address table containing a pre-stored list of addresses valid for network 10. The router 20 may also have a third comparator which determines if the packet's IP source address 46 and the TCP source address 50 are in a source address table containing a pre-stored list of source addresses which are not allowed to communicate with devices on network 10. If a packet has the correct protocol and has acceptable destination and source addresses, the router 20 allows it to pass to network 10. These comparisons are applied to all data packets regardless of their source or destination. Similar processing may be applied by router 20 for packets passing out of network 10 using similar comparators and tables. Because it screens packets flowing between networks, router 20 is one example of a network access control device.

Firewall 30d is another example of a network access control device that provides control of packet flow in a somewhat different way. As shown in FIG. 2, firewall 30d is linked to intranet 40 via link 24. Firewall 30d, in turn, is linked to router 20 via link 22. Instead of providing a direct connection for packet flow between networks (like router 20), communications between network 10 and intranet 40 are handled by setting up two independent TCP/IP connections, one maintained by network 10, the other one maintained by intranet 40. Typically, when an incoming packet reaches firewall 30d from outside of network 10, it is examined by a rules processor which determines whether the information in the packet satisfies rules contained in an allow rules table and a deny rules table executing in CPU 101 on firewall 30d. These rules are used to test information contained in each packet as well as system information, such as time of day, to determine whether to allow or refuse to set up connections for packet communication between the source and destination. The rules may specify, for source users and destination users: (1) the time and date intervals when a rule should apply; (2) the types of services allowed; (3) special services allowed; (4) types of authentication; and (4) alert thresholds, which define the number of attempted accesses in violation of the rule per unit of time before an alert message is generated. The rules processor uses the allow rules and deny rules together, for example, to grant access to a class of users but deny access to a particular user or users otherwise granted access by the allow rules. The rules processor applies the allow rules and deny rules to connection type packets that reach firewall 30d. Once the rules are satisfied and the two connections are established, other non-connection management packets may be copied from one connection to the other without extensive rule testing.

An IMDS access control device in accordance with the subject invention is shown in FIG. 2. IMDS 65 is coupled to network 10 in a manner similar to that of clients 30a-e and router 20. It is therefore visible to network users and since it maintains its own collection of seemingly real and vulnerable clients, it is also more attractive to an intruder. Router 20 is set up such that any packet 31 with a destination address not in virtual network 60 will be forwarded to firewall 30d. Any packet with a destination address 44 in virtual network 60 will be forwarded to IMDS 65. The virtual network 60 operating on IMDS 65 is used to attract intruders and log their activity. It is divided into individual virtual or synthetic hosts, each with its own IP address. These hosts are created by a set of software-based service simulations, or "façades." The façade services associated with a virtual client are appropriate for the type of host being simulated. In other words, a virtual DNS host will maintain believable mappings between virtual alphanumeric host names and numeric IP addresses, while a virtual mail server will store credible examples of email files.

Figure 5:
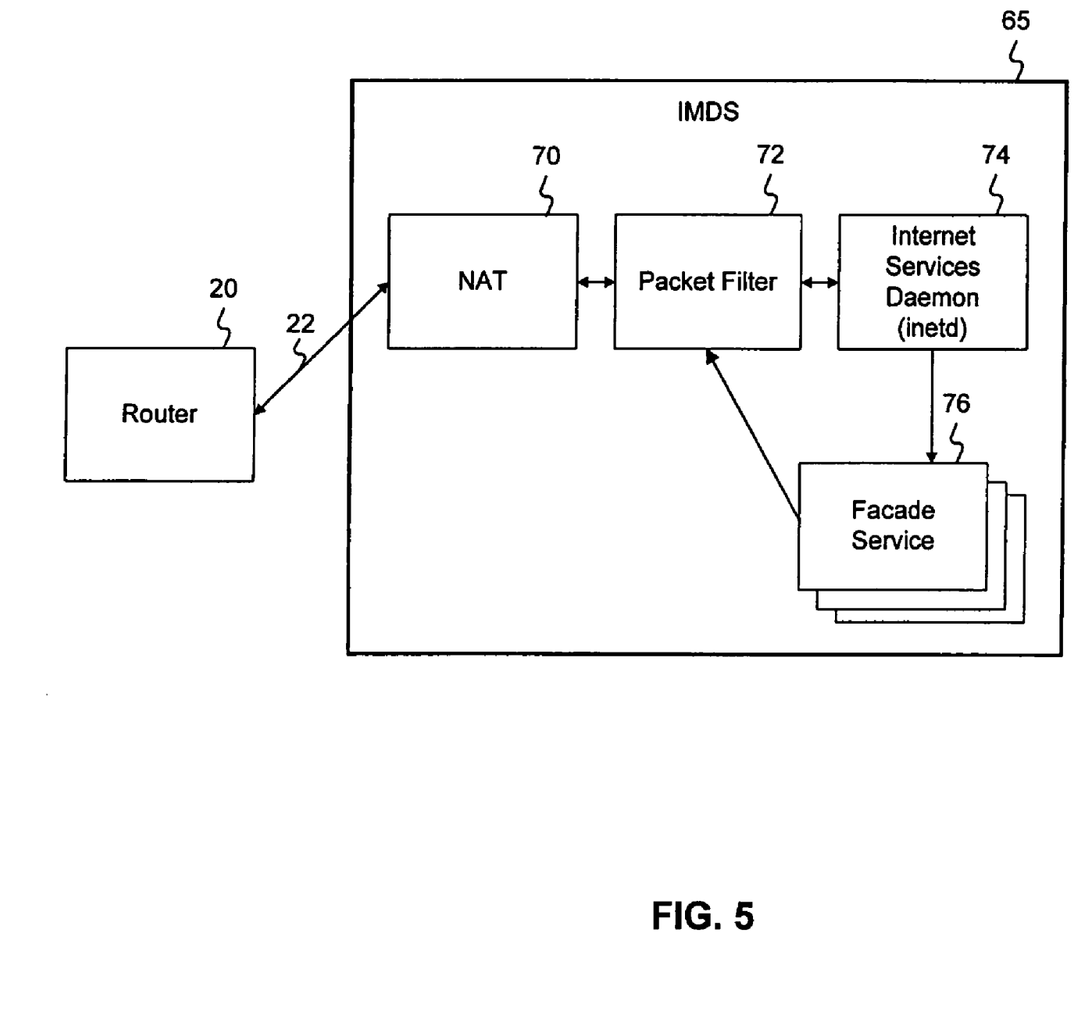
FIG. 5 is a detailed block diagram of the software modules for performing intrusion detection in accordance with the present invention.

IMDS 65 performs three functions: intrusion detection, intrusion notification and system administration. Intrusion detection is accomplished through a set of software packages as shown in FIG. 5, including a network address translator (NAT) 70, a Packet filter 72, an Internet services daemon (inetd) 74, and layered façade services 76. NAT 70 acts as an interface between physical network 10 and virtual network 60. On the physical network 10, NAT 70 connects to a router 20 via link 22. Router 20, in turn, acts as an interface between IMDS 65 and Internet destinations outside of network 10. Inside IMDS 65, NAT 70 connects to Packet filter 72 which in turn, is linked to inetd 74 and layered façade services 76.

Figure 6:
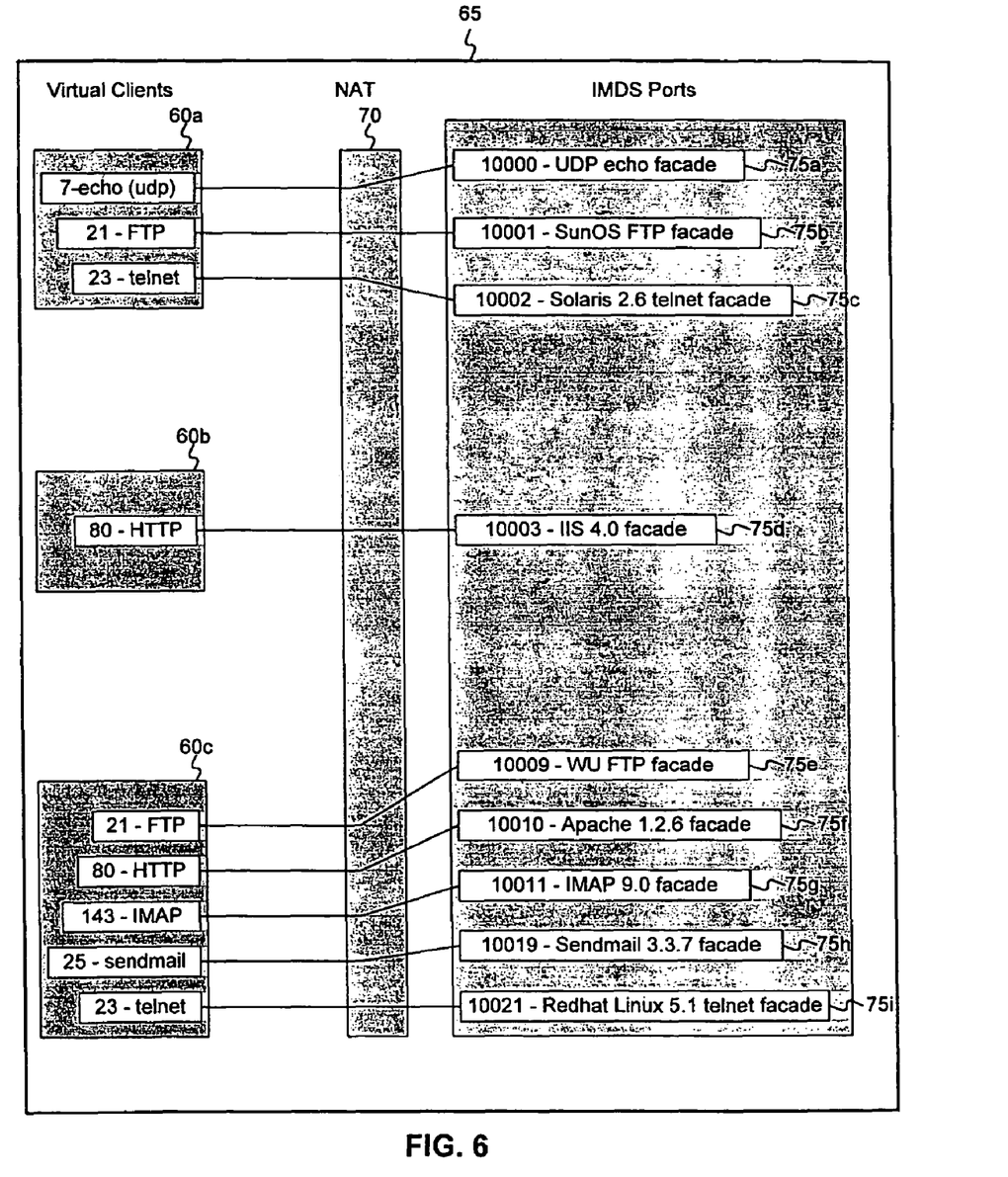
FIG. 6 is a detailed block diagram of the interface between the virtual clients and the intrusion misuse deterrence system in accordance with the present invention.

Operation of an intrusion detection function in accordance with the present invention is best explained by way of an example. Assume that an entity operating outside of network 10 sends packet 31 via the Internet to router 20. Packet 31 is destined for IMDS 65 as indicated by IP header 36. That is, destination address 44 equals a destination address in virtual network 60. Upon receiving packet 31, router 20 routes packet 31 along link 22 to IMDS 65. To this point, the system behaves consistently with most conventional networking protocols. However, since packet 31 contains a destination address 44 which is not an actual network client, NAT 70 must route the packet to a port 75 in IMDS 65. As shown in FIG. 6, IMDS 65 is also comprised of a plurality of virtual clients 60a-c with corresponding IMDS ports 75a-i. IMDS 65 includes a port 75 for all or a subset of all of the global class "C" IP source addresses allocated to virtual network 60. While this specification describes IMDS 65 as a class "C" virtual network, it is understood that the network can be a class "A" or a class "B" network as well. When IMDS 65 receives a request to access port 23 (the standard telnet port) on virtual client 60a, NAT 70 maps the request to port 75c on IMDS 65. NAT 70 may simultaneously map up to 254 (class "C" network) requests to access various ports of IMDS 65. After NAT 70 determines the proper route for packet 31, it sends the packet to Packet filter 72. Packet filter 72 is used to block simultaneous access to any of the ports 75 actually being used by IMDS 65. It is also used to allow access to the administrative ports from the list of administrative workstations configured during installation, as explained below. Packet 31 is then passed to inetd 74, which is configured to execute the correct façade service 76 based on the destination port given by NAT 70. The façade service 76 then responds to packet 31 appropriately, and returns the response packet to the original network entity. After the session completes, the IMDS port 75 may be made available to another network entity. While this specification describes the system as if processing is performed serially, it is important to note that in a preferred embodiment, multiple simultaneous port connections are possible.

Figure 7:
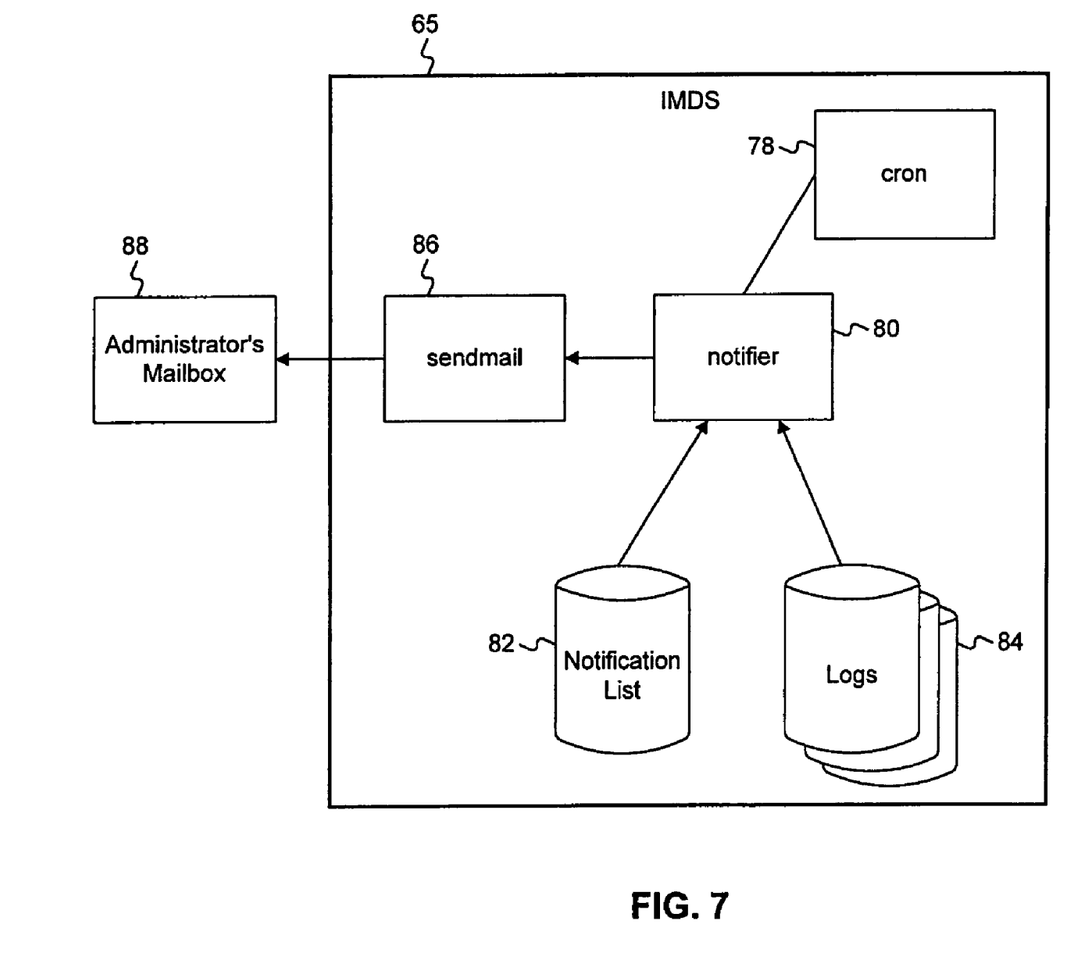
FIG. 7 is a detailed block diagram of the interface between an administrator's mailbox and the intrusion misuse deterrence system in accordance with the present invention.

Whenever IMDS 65 determines that an entity has accessed façade services 76, it acts as if the entity is an intruder. This is a valid assumption since by definition, all activity on IMDS 65 is of suspect origin. The elements of IMDS 65 that identify an intruder and notify a system administrator are shown in FIG. 7. Specifically, the intruder identification and notification system is comprised of daemon cron 78, notifier routine 80, notification list 82, change logs 84, sendmail routine 86 and at least one administrator mailbox 88. Daemon cron 78 observes applications registered with it and invokes notifier routine 80 when changes are noticed. Notification list 82 contains a list of all network locations. Change logs 84 store data records for each network access event. That is, each time an entity attempts to access an IMDS port 75, change log 84 creates and stores a data record identifying the transaction. The recorded changes comprise packets of processed information that typically are used by system administrators for creating audit trails, failure recovery, and undo operations. Since they identify the source of the of the packet, these records may also be used to identify a network intruder. Sendmail routine 86 composes email messages and routes the messages to mailboxes 88 using information received from notifier routine 80. In operation, the intruder identification and notification process associated with IMDS 65 executes commands found in "crontab" files located in daemon cron 78. These commands specify the operations to be performed and the network entities to be notified when an intruder is detected.

Figure 8:
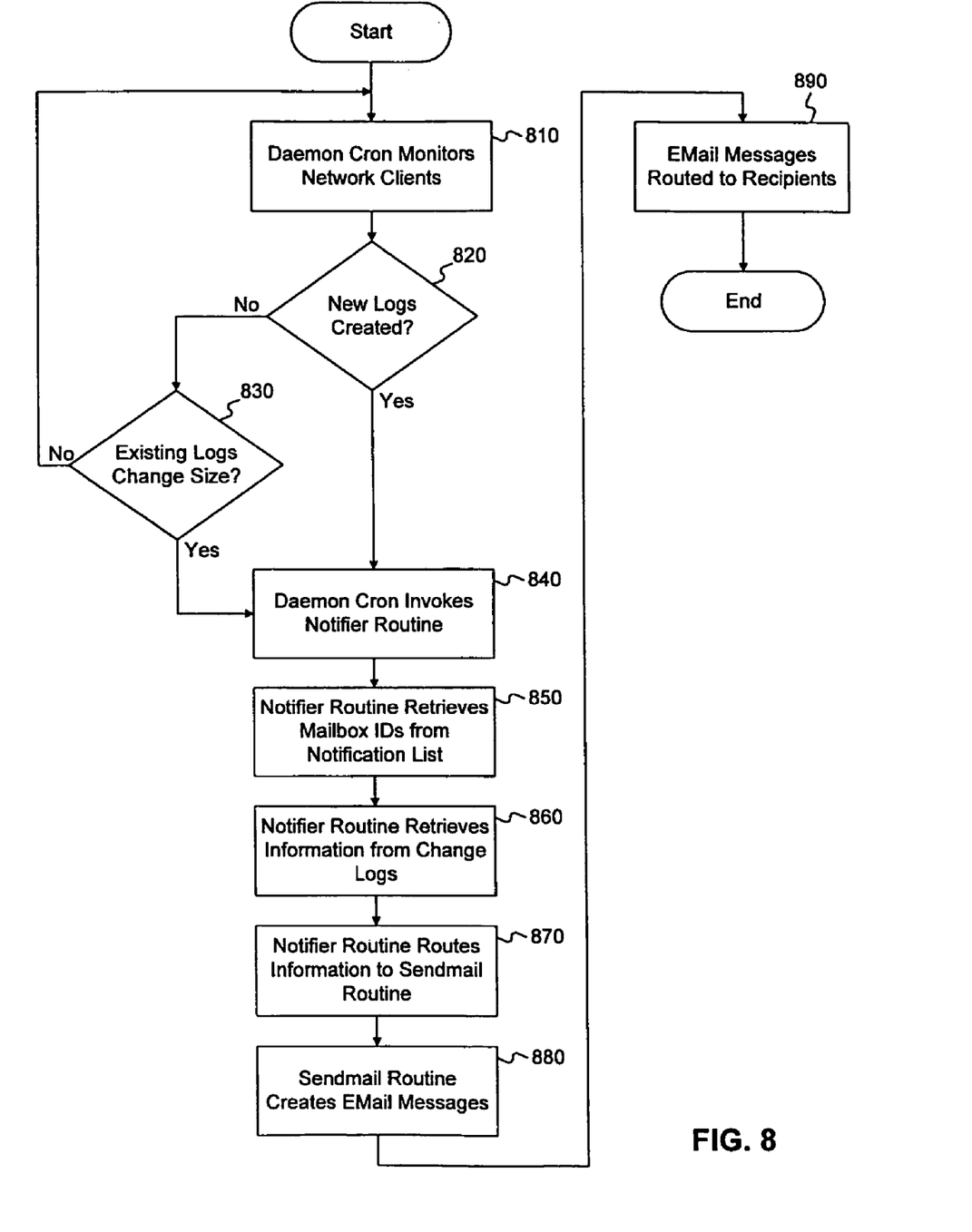
FIG. 8 is a detailed flow chart of the process for identifying an intruder in accordance with the present invention.

As shown in FIG. 8, the operation of the intruder identification and notification system begins in step 810 with daemon cron 78 monitoring a predefined collection of virtual network clients 60. It does this by keeping track of what change logs 84 exist and their size. If any new logs 84 are created (step 820) or any logs change size (step 830), daemon cron 78 invokes notifier routine 80 in step 840. In step 850, notifier routine 80 accesses notification list 82 and retrieves identifiers for mailboxes to be notified. It also retrieves the changed information from change logs 84 in step 860. Notifier routine 80 then routes information to sendmail routine 86 (as shown in FIG. 7) in step 870. In step 880, sendmail routine then creates email messages using the information received from notifier routine 80. The email messages are next routed to their intended recipients in step 890. In a preferred embodiment, the notification process is run every ten minutes, but the frequency can be increased or decreased based on the perceived threat to the network. While this specification describes the intruder identification and notification system as one in which email messages are utilized to indicate the presence of intruders, any method can be used including real time notification via a system message, or by logging intrusion in a file for later retrieval by a system administrator. Once an intruder is identified, IMDS 65 may also extract the source address of the packet 31 and update comparators, and deny rules tables of associated routers and firewalls, respectively. It may further update deny rules tables stored on IMDS 65 to prevent the intruder from accessing IMDS 65 again.

From the foregoing description, it will be appreciated that the present invention provides an efficient system and method for increasing the security of computer networks through the use of an IMDS operating on a computer network. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow chart in FIG. 8. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method, comprising:
    receiving an inbound packet including a destination address;
    sending a notification indicating the presence of a network intruder when the destination address is associated with one of a plurality of synthetic hosts, the plurality of synthetic hosts being part of a synthetic network executing on a single server.

2. The method of claim 1, wherein the address is an Internet Protocol (IP) address, and the synthetic network simulates an IP network.

3. The method of claim 1, wherein each of the plurality of synthetic hosts simulates at least one service.

4. The method of claim 3, further comprising:
    determining a requested service of the inbound packet based on the destination address;
    routing the inbound packet to one of the plurality of the synthetic hosts based on the destination address;
    executing one of the at least one service of the one of the plurality of synthetic hosts when the requested service matches the one of the at least one service.

5. The method of claim 1, further comprising:
    logging information related to the receipt of the inbound packet;
    wherein the notification includes the information.

6. A non-transitory processor-readable medium storing instructions configured to cause the processor to perform the method of claim 1, when executed by the processor.

7. A method comprising:
    receiving a packet having a destination address, the destination address within a plurality of network addresses associated with a server simulating a plurality of synthetic hosts, each of the plurality of synthetic hosts associated with one of the plurality of network addresses;
    determining a service to which the packet is directed, based on the destination address;
    routing the packet to a façade service port of the server based on the destination address and the service;
    executing a façade service associated with the façade service port upon receipt of the routed packet, the façade service simulating the service;
    logging information related to the packet in a log;
    sending a notification after logging, the notification including the information.

8. The method of claim 7, wherein the information includes the destination address and a source address of the packet.

9. The method of claim 8, further comprising:
    updating a deny rules data structure based on the source address of the packet.

10. The method of claim 7, wherein the destination address includes an Internet Protocol (IP) address and a port number associated with the service.

11. The method of claim 10, wherein the plurality of network addresses is a set of "class C" IP network addresses.

12. The method of claim 7, wherein sending the notification includes
    detecting changes to applications simulated on the server in response to executing the façade service;
    logging information reflecting the changes in the log;
    sending the notification, wherein the notification further includes the information reflecting the changes.

13. The method of claim 7, further comprising:
    blocking access to the façade service when the façade service port associated with the façade service is in use.

14. The method of claim 7, wherein sending the notification includes:
    detecting one of the creation or modification of the log;
    determining one or more destinations for the notification;
    sending the notification to the one or more destinations.

15. The method of claim 14, wherein sending the notification further includes:
    waiting a predetermined period before performing the detecting, determining and sending.

16. A non-transitory processor-readable medium storing instructions configured to cause the processor to perform the method of claim 7, when executed by the processor.

* * * * *